US009628358B2

(12) United States Patent
Baillargeon

(10) Patent No.: US 9,628,358 B2
(45) Date of Patent: Apr. 18, 2017

(54) METHOD AND SYSTEM FOR PIGGYBACKING RADIO DATA IN IP MEASUREMENTS

(71) Applicant: Steve Baillargeon, Gatineau (CA)

(72) Inventor: Steve Baillargeon, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 423 days.

(21) Appl. No.: 14/040,938

(22) Filed: Sep. 30, 2013

(65) Prior Publication Data
US 2014/0098679 A1 Apr. 10, 2014

Related U.S. Application Data

(60) Provisional application No. 61/710,243, filed on Oct. 5, 2012.

(51) Int. Cl.
H04L 12/26 (2006.01)
H04W 24/02 (2009.01)
H04W 24/10 (2009.01)

(52) U.S. Cl.
CPC .............. H04L 43/08 (2013.01); H04L 43/50 (2013.01); H04W 24/02 (2013.01); H04W 24/10 (2013.01)

(58) Field of Classification Search
CPC ..... H04L 43/10; H04L 43/0888; H04L 43/50; H04L 12/2697; H04L 43/0829; H04L 43/0864; H04L 41/145; H04L 41/5003; H04L 41/5038; H04L 43/026; H04L 43/08; H04L 43/0858; H04L 43/087; H04L 43/12; H04L 43/0852; H04L 43/0882; H04L 43/16; H04L 12/2602; H04L 41/147;
(Continued)

(56) References Cited

U.S. PATENT DOCUMENTS

2009/0135773 A1 5/2009 Aghili et al.
2012/0063345 A1* 3/2012 Krzanowski ............ H04L 41/04
370/252
(Continued)

FOREIGN PATENT DOCUMENTS

EP 2482492 A1 8/2012
WO WO2010063104 A1 6/2010

OTHER PUBLICATIONS

PCT International Search Report PCTIB2013059126.

Primary Examiner — Chi H Pham
Assistant Examiner — Lionel Preval
(74) Attorney, Agent, or Firm — Ericsson Canada Inc.

(57) ABSTRACT

A method and system for measuring the performance of the end-to-end mobile subscriber connection is disclosed. Test traffic originating from the network is sent to the mobile device and the mobile device acting as a test traffic reflector includes current radio bearer conditions that may be impacting the end-to-end performance of the subscriber connection within the test traffic that is returned back to the source. The radio access node acting as a test traffic interceptor includes current radio cell conditions that may be impacting the end-to-end performance of all subscriber connections in the cell within the test traffic that is returned back to the source. The test equipment or controller collects, calculates and reports the IP test performance towards the mobile device and radio node with correlation to the radio bearer and radio cell performance.

25 Claims, 18 Drawing Sheets

(58) Field of Classification Search
CPC ...... H04L 43/00; H04L 43/106; H04W 24/08; H04W 24/00; H04W 88/08; H04W 24/10; H04W 28/0236; H04W 24/02
USPC .............................. 370/251, 252, 235, 328
See application file for complete search history.

(56) References Cited

U.S. PATENT DOCUMENTS

| | | | |
|---|---|---|---|
| 2014/0056143 A1* | 2/2014 | Hedlund et al. ............. | 370/235 |
| 2014/0056218 A1* | 2/2014 | Hedlund ............... | H04L 47/365 |
| | | | 370/328 |
| 2014/0160972 A1* | 6/2014 | Ketonen ..................... | 370/252 |

* cited by examiner

METHOD AND SYSTEM FOR PIGGYBACKING RADIO DATA IN IP MEASUREMENTS

RELATED APPLICATION

The present application is related to, and claims priority from, U.S. Provisional Patent Application No. 61/710,243 filed Oct. 5, 2012, entitled "Method and System For Piggybacking Radio Data In IP Measurements", to Steve Baillargeon, the disclosure of which is incorporated herein by reference. The present application is also related to U.S. patent application Ser. No. 13/442,196 filed Apr. 9, 2012, entitled "Test Traffic Tunnel Interceptor", to Steve Baillargeon, the disclosure of which is also incorporated herein by reference.

TECHNICAL FIELD

This disclosure relates generally to network traffic testing and more particularly, to active probing of mobile subscriber connection.

BACKGROUND

Active IP probe based sampling of the mobile subscriber connection is established as the preferred methodology for measuring the end-to-end state and performance of the subscriber connection across the mobile network. Packet delay, packet loss and UDP/TCP throughput measurements can be estimated for troubleshooting, network characterization and application performance estimation on a per-subscriber basis. For instance, Iperf is a commonly used network testing tool that can create TCP and UDP data streams and measure the throughput of a network that is carrying them. Iperf has a client and server functionality, and can measure the throughput between two endpoints, either uni-directionally or bi-directionally.

The geographical location (e.g. device located at cell edge or near cell tower), the channel quality indicator, QoS class identifier, and the modulation and coding schemes for the downlink and uplink directions of the mobile subscriber connection have direct impact on the packet delay, packet loss and UDP/TCP throughput measurements. The radio node scheduling activity, radio node processor utilization and the number of subscribers in the cell serving the mobile subscriber may also positively or negatively impact the end-to-end performance.

Current active probe techniques are designed to measure the performance of the end-to-end mobile subscriber connection in terms of packet delay, packet loss and UDP/TCP throughput measurements but do not provide radio data to determine the actual conditions in which those measurements were performed. In addition, end-to-end IP test traffic initiated from the network or from the UE does not carry radio information describing the context and conditions in which those measurements were performed. Also, mobile device traces collected by the radio network enables the operator to record signaling events and UE-specific radio measurements but add significant stress to the network and do not measure the performance of end-to-end IP user plane subscriber connection. Radio-specific measurements that are triggered and collected by the UE do not measure the performance of the end-to-end IP subscriber connection and correlating UE-specific radio performance statistics produced by different entities (UE, eNB, etc) with the IP test traffic results is not trivial and requires additional post-processing of data from different nodes. Doing the correlation on a per packet basis is not supported.

Accordingly, it would be desirable to provide devices, systems and methods for measuring the performance of the end-to-end mobile subscriber connection in such systems that avoid the aforementioned described problems and drawbacks.

SUMMARY

According to an exemplary embodiment, method, stored in a memory and executed on a processor, for measuring end-to-end path condition indicators of a mobile subscriber connection, comprises: sending a test packet from a network source to a mobile subscriber device connected to a radio access node, said test packet having an indicator informing said mobile subscriber device to include radio bearer conditions to said test packet, said mobile subscriber device acting as a test traffic reflector; and receiving, at said network source, a test packet reply, generated by said mobile subscriber device, said test packet reply including current radio bearer conditions impacting the performance of the mobile subscriber device connection.

According to another exemplary embodiment, a method, stored in a memory and executed on a processor, for measuring end-to-end path condition indicators of a mobile subscriber connection, comprises: receiving, by a mobile subscriber device, a test packet sent from a network source, said test packet having an indicator informing said mobile subscriber device to include radio bearer conditions to said test packet, said mobile subscriber device acting as a test traffic reflector; and sending, by said mobile subscriber device, a test packet reply, to said network source, said test packet reply including current radio bearer conditions impacting the performance of the mobile subscriber device connection.

According to another exemplary embodiment, a node for measuring end-to-end path condition indicators of a mobile subscriber connection, comprises: a test packet generator for sending from said node to a mobile subscriber device, a test packet having an indicator informing said mobile subscriber device to include radio bearer conditions to said test packet, said mobile subscriber device acting as a test traffic reflector; a test controller for calculating and reporting test packet performance associated with said radio bearer performance; and a test packet interceptor at a radio access node serving said mobile subscriber device, for intercepting a test packet reply from said mobile subscriber device, and to further include radio cell conditions within the test packet reply.

According to another exemplary embodiment, a method, stored in a memory and executed on a processor, for measuring end-to-end path condition indicators of a mobile subscriber connection, comprises: sending a test packet from a network source to a mobile subscriber device, said test packet having an indicator informing said mobile subscriber device to include radio bearer conditions to said test packet, said mobile subscriber device acting as a test traffic reflector; intercepting a test packet replay generated by said mobile subscriber device at a radio access node serving the mobile subscriber device to include radio cell conditions; receiving, at said network source, said test packet reply; and collecting, at said network source, one or more test packet replies to calculate end-to-end path condition performance.

The method and system of the present invention provide a number of enhancements, including but not limited to providing a definition of a structure for embedding the radio bearer conditions in the payload of the UDP or TCP test packets, a definition of a behavior at the test traffic reflector (mobile device) responsible to populate the radio subscriber conditions in the payload of the UDP or TCP test packets, a definition of a structure for embedding the radio cell conditions in the payload of the UDP or TCP test packets, a definition of a behavior at the test traffic interceptor (radio access node) responsible to populate the radio cell conditions in the payload of the UDP or TCP test packets and a definition of a behavior at the test traffic originator (the network test equipment) responsible to extract the radio bearer and cell information and correlate it with the IP performance data.

ABBREVIATIONS

In order to lighten the following description, the following acronyms will be used:
CCE Control Channel Element
CQI Channel Quality Indicator
CGI Cell Global Identity
DL Downlink
eNB Enhanced NodeB
IMSI International Mobile Subscriber Identity
IP Internet Protocol
MCS Modulation and Coding Scheme
PDCCH Physical Downlink Control Channel
QCI QoS Class Identifier
RAC Radio Admission Control
RRC Radio Resource Control
TWAMP Two-Way Active Measurement Protocol
UDP User Datagram Protocol
UE User Equipment
UL Uplink

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of path performance determination and associated nodes in communication systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The IETF IP Performance Metrics (IPPM) working group has defined a two-way IP active measurement protocol called Two-Way Active Measurement Protocol (TWAMP). TWAMP is designed for measuring one-way and two-way (round-trip) packet delay, packet loss and available path capacity using UDP data streams between two hosts. Iperf is also commonly used for network testing. Iperf creates TCP and/or UDP data streams and measure the throughput across the network.

Figure 1:
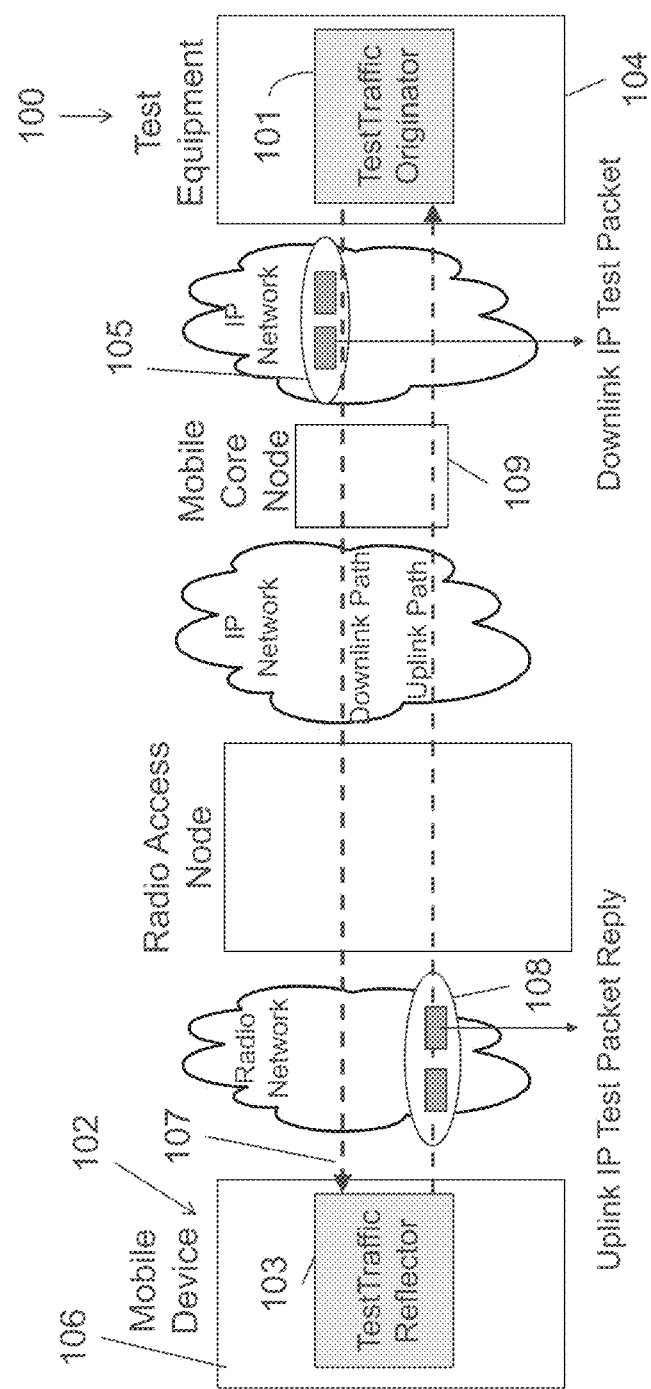
FIG. 1 is a block diagram of a communication system having client and server functionality to measure the path performance between two ends, bi-directionally.

TWAMP and Iperf allow the user to set various parameters that can be used for testing a network, or alternately for optimizing or tuning a network. TWAMP and Iperf have a client and server functionality, and can measure the path performance between the two ends bi-directionally. Such a client and server network is shown in FIG. 1. The client 100 plays the role of the test traffic originator 101 and the server 102 plays the role of the test traffic reflector 103. The client 100 is running on a test equipment 104 and is responsible to initiate the test streams and associated downlink traffic 105. The function of the test traffic originator 101 can also be embedded or integrated within a mobile core node 109. The server 102 is running on the mobile device 106 and is responsible to listen for incoming test packets on its UDP port or TCP port 107 and dynamically creates a session state for the test connection. When the test packets are carried over UDP, the test traffic reflector function 103 on the mobile device 106 transmits a test packet reply 108 on the uplink, back to the client 100 in response to every received test packet.

Figure 2:
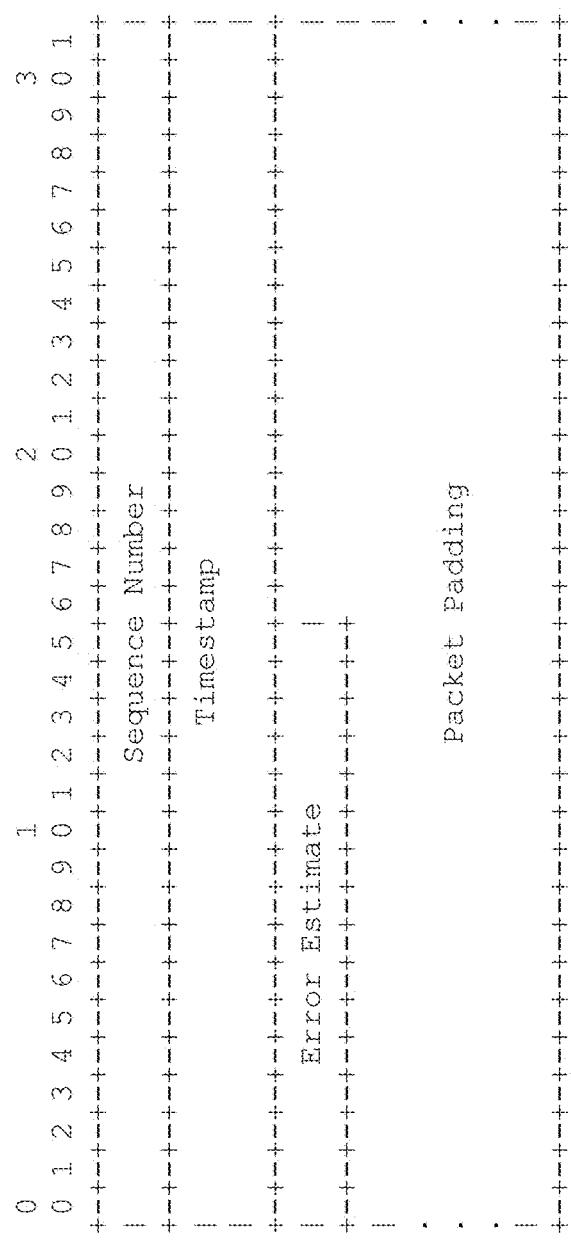
FIG. 2 depicts a standard (downlink) TWAMP IP test packet request originating from the test equipment in unauthenticated mode.
Figure 3:
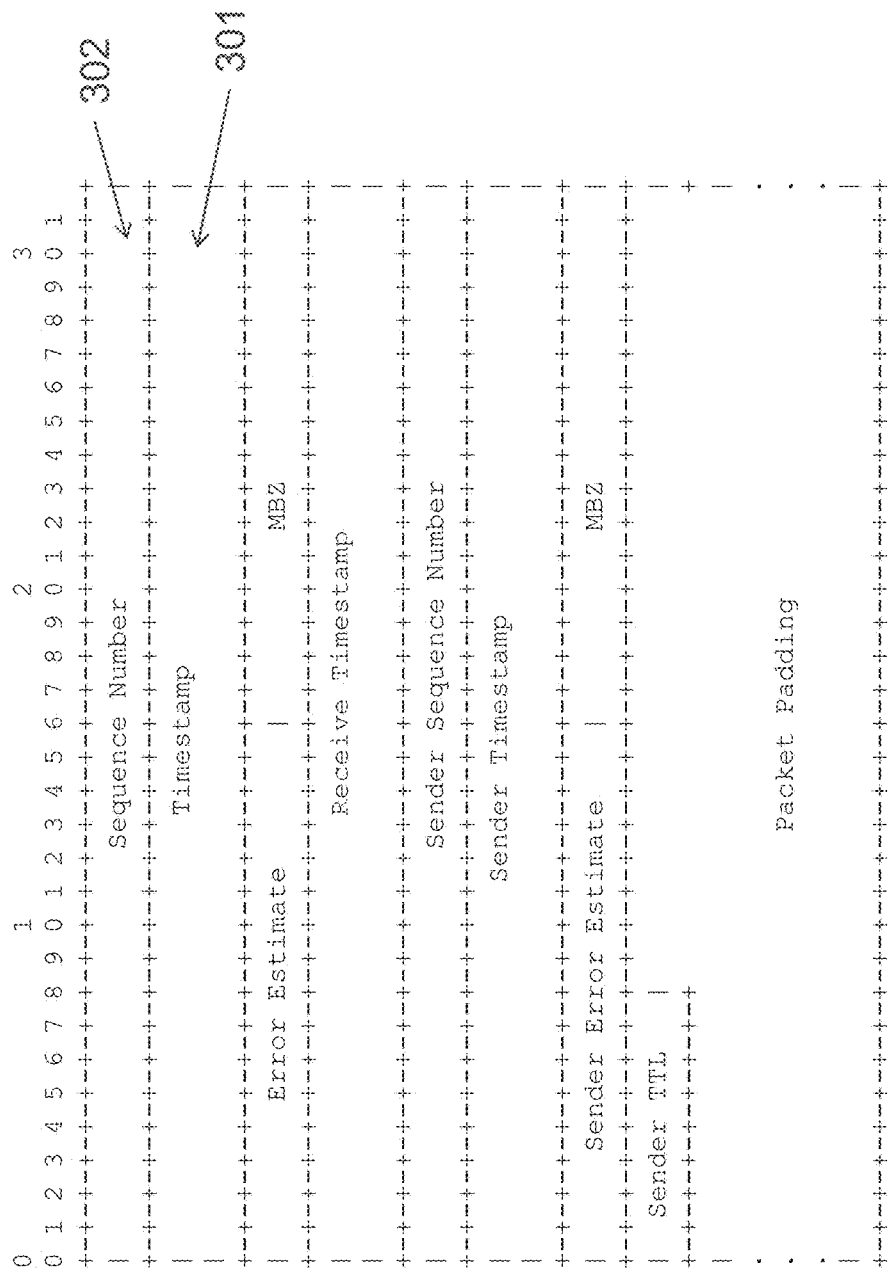
FIG. 3 depicts a standard (uplink) TWAMP IP test packet reply transmitted by the mobile device.

With TWAMP, the downlink test packets originating from the test equipment 104 are time stamped, tagged with sequence numbers and transmitted to a mobile device 106. FIG. 2 depicts the standard (downlink) TWAMP IP test packet request originating from the test equipment 104 in unauthenticated mode. FIG. 3 shows the standard (uplink) TWAMP IP test packet reply transmitted by the mobile device 106. Just before transmission, the uplink test packet replies are also time stamped 301 and tagged with sequence numbers 302 by the mobile device 106. The content of the uplink test packet reply is different from the downlink packet because it contains additional timestamps 301 and sequence number 302 in order to measure the end-to-end IP path performance in both directions.

Figure 4:
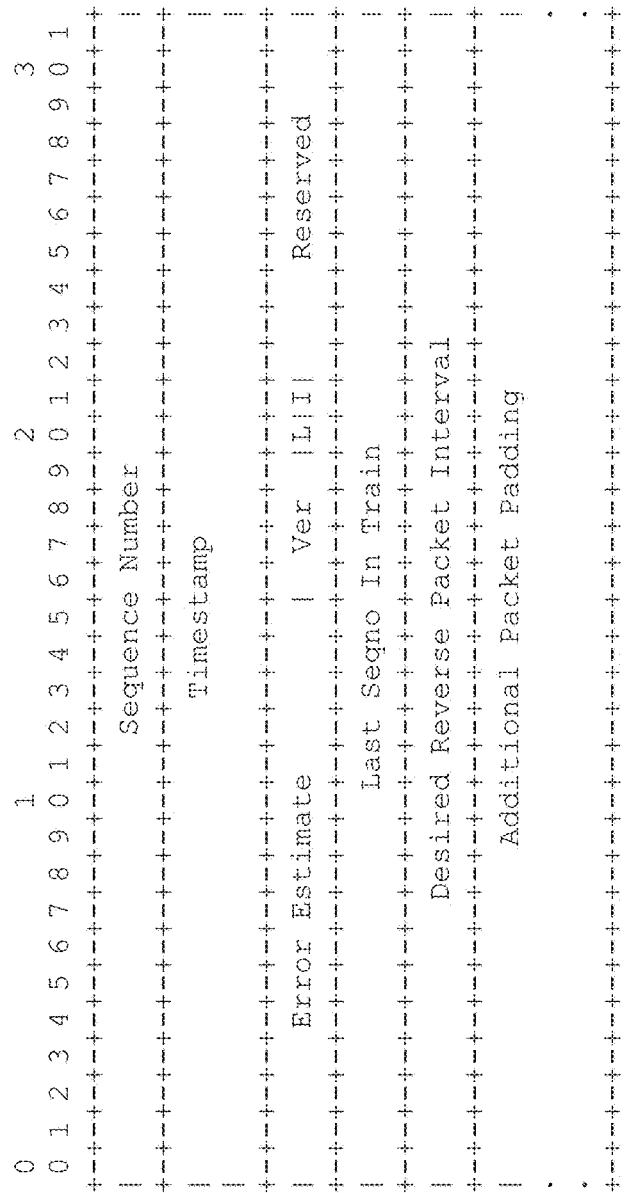
FIG. 4 depicts a (downlink) test packet request with padding version 1 for carrying additional information.
Figure 5:
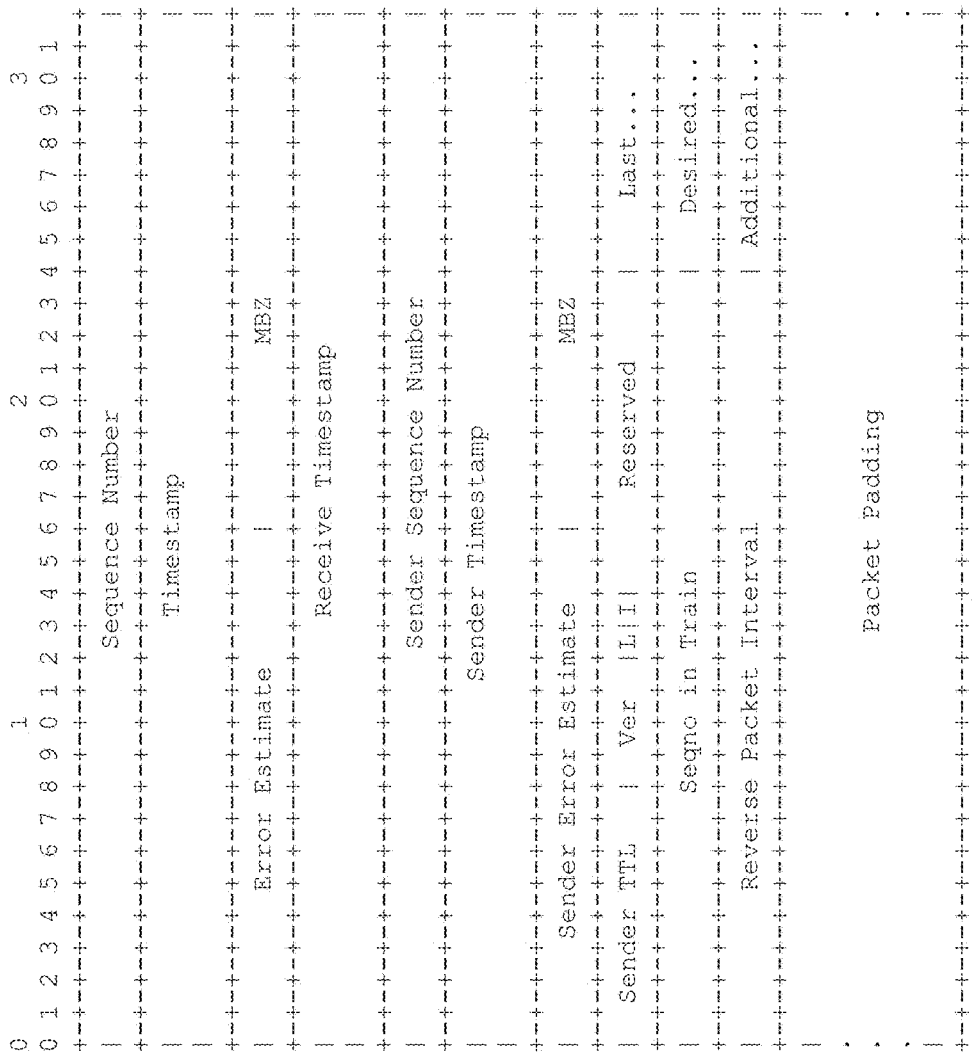
FIG. 5 depicts a (uplink) test packet reply with padding version 1 for carrying additional information.

In FIGS. 4 and 5, we have shown the TWAMP test packet request and test packet reply that are extended to carry additional information to help measure or estimate the available IP path bandwidth capacity in the downlink and uplink directions. FIGS. 4 and 5 describe what is known as the TWAMP value-added octets for two-way IP active measurement protocol, previously being used.

The existing TWAMP or Iperf IP test packets do not contain any radio information or fields.

Figure 6:
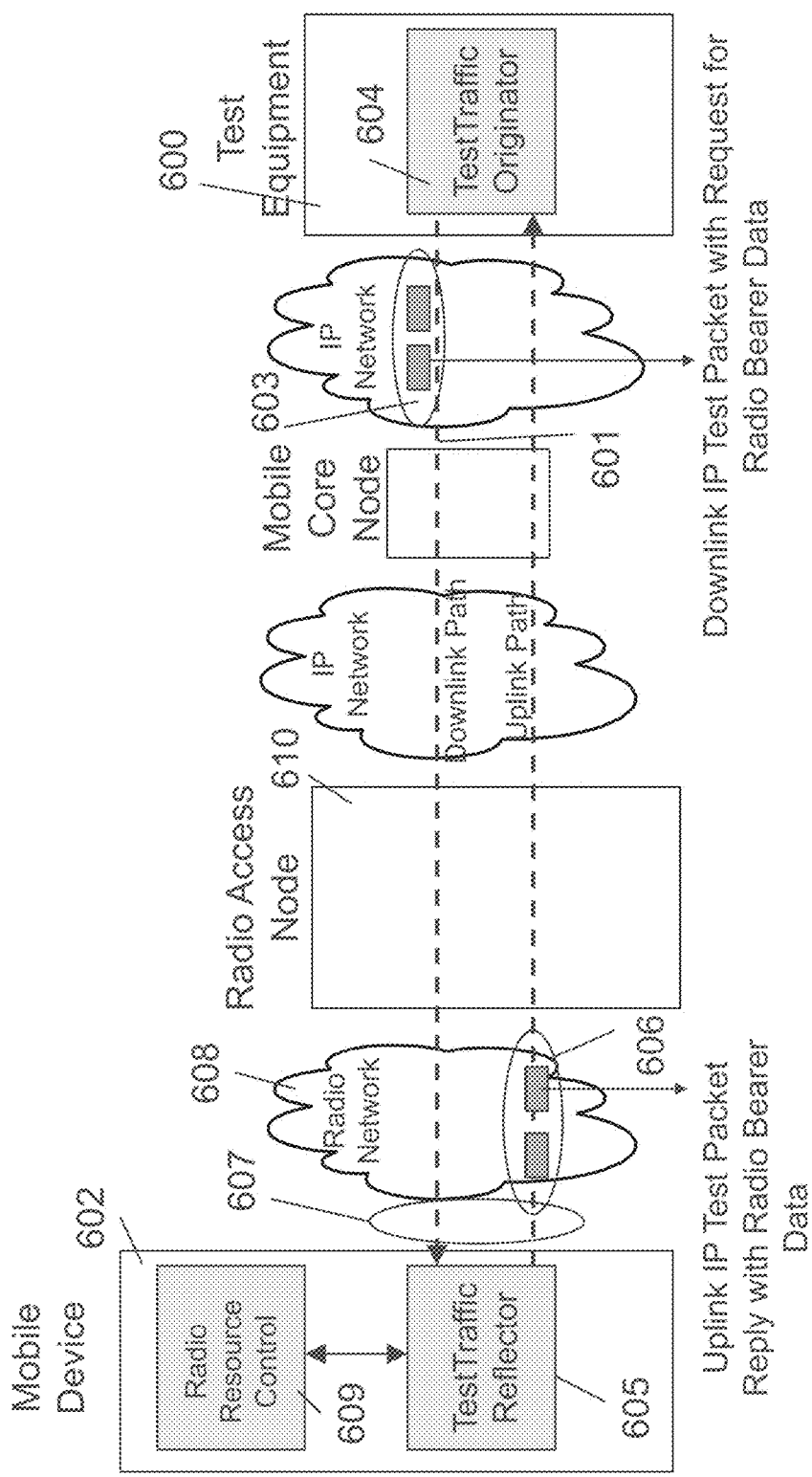
FIG. 6 depicts a block diagram of a communication system according to an exemplary embodiment of the present invention.

FIG. 6 is an exemplary embodiment of a communication system for measuring an end-to-end mobile subscriber connection. The test equipment 600 initiates one or more test streams 601 towards a specific mobile device 602. Test packets 603 originate from the test traffic originator 604 and each test stream is configured with the destination IP address assigned to the subscriber connection of the mobile device 602. The test equipment 600 includes an indication in each downlink test packet request 603 informing the mobile device 602 to attempt piggybacking or including radio bearer conditions or data within the test stream 601. When the test packets are carried over UDP, the test traffic reflector function 605 on the mobile device 602 transmits a test packet reply 606 back on the uplink to the test equipment 600 in response to every received test packet. Each test packet reply 606 may contain radio bearer data indicative of the condition of the radio bearer 607 between the radio network 608 and mobile device 602. This data is provided by the mobile device 602 upon receipt of instructions by the radio resource control block 609.

Some examples of radio bearer data include cell global identity that the mobile device is connected to, mobile device geographical position or coordinates, Quality of Service class identifier (QCI) for the radio bearer, channel quality indicator (CQI) reported to the radio access node, and downlink and uplink downlink modulation coding scheme (MCS).

Figure 7:
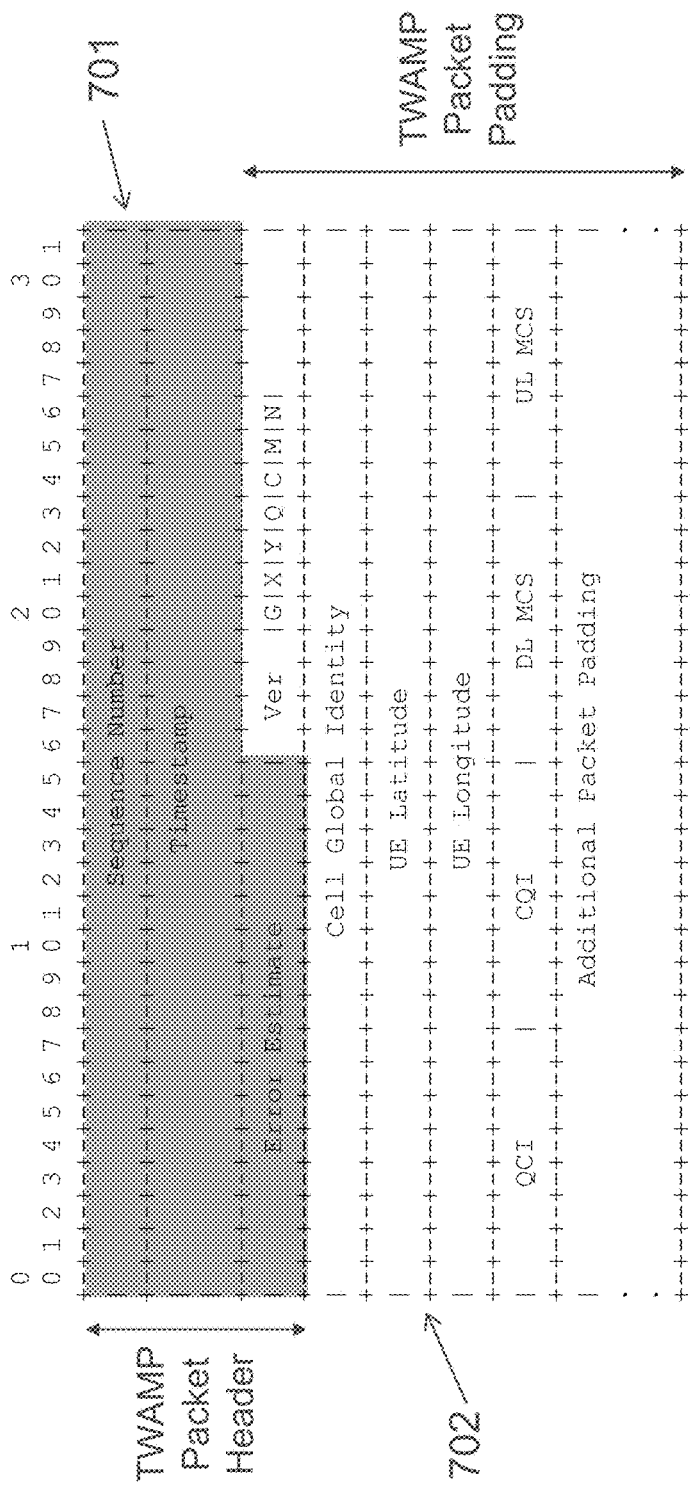
FIG. 7 depicts a (downlink) TWAMP test packet request according to an exemplary embodiment of the present invention.

An exemplary embodiment of a proposed (downlink) TWAMP test request packet is shown in FIG. 7. The test packet request is divided in two sections: a header section 701 and a padding section 702. The test packet request header 701 from each downlink test packet includes the fields for measuring the path performance in the downlink direction up to the mobile device. The test packet request padding 702 includes the fields describing the radio bearer conditions. In the downlink direction, the packet fields describing the radio subscriber conditions are set to 0 by the test equipment except for the Ver. (Version) field.

Figure 8:
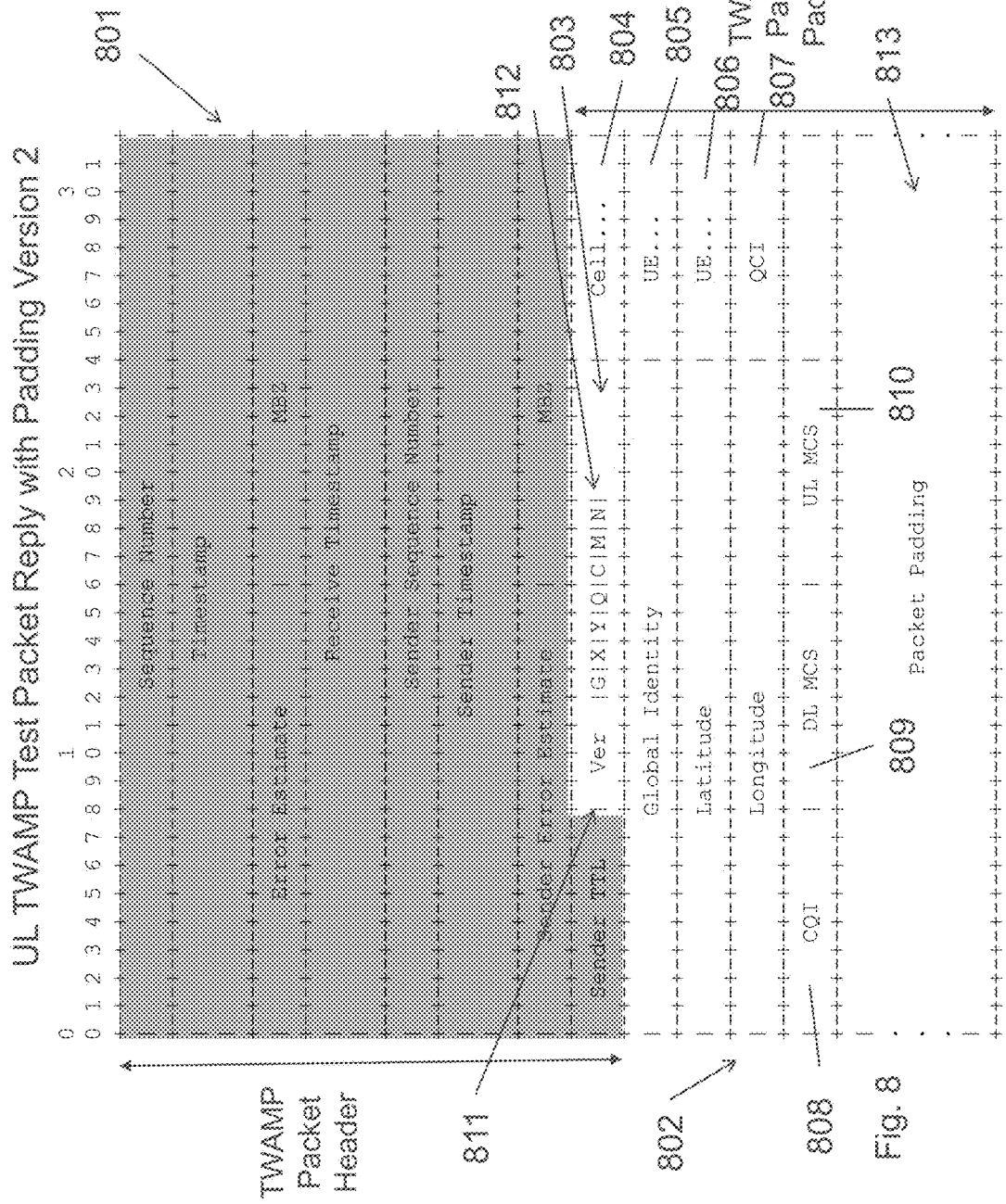
FIG. 8 depicts a (uplink) TWAMP test packet reply according to an exemplary embodiment of the present invention.

FIG. 8 illustrates a proposed TWAMP test packet reply format sent uplink back to the test equipment. The description of FIG. 8 will be made in conjunction with the system of FIG. 6.

The test packet header 801 from each test packet reply includes the fields for measuring the path performance in the uplink direction. It also includes the path performance information collected from the corresponding downlink test packet. The test packet reply padding 802 includes the packet fields describing the radio subscriber conditions. In the uplink direction, the packet fields describing the radio bearer condition is populated by the mobile device.

The first 18 bytes of the padding 802 carry the version number and flags 803, cell global identify (CGI) 804, mobile device coordinates (longitude and latitude) 805 and 806, respectively, QoS class identifier (QCI) 807, quality channel quality indicator (CQI) 808, downlink modulation coding scheme (DL MCS) 800 and uplink modulation coding scheme (UL MCS) 810. The version number and the sequence of flag bits 803 are defined at the very beginning of the padding octets 802.

The Version (Ver) field 811 is encoded in the first 4 bits. The padding version number identifies the structure of the padding octets, meaning of the flag bits and the behavior of test traffic originator 604 and reflector 605. For example, this embodiment defines version 2 for the purpose of piggybacking or inserting radio subscriber conditions at the mobile device 602 with seven flag bits: G, X, Y, Q, C, M and N 812. The version field is populated by the test equipment 600.

The version number provides one method for informing the test traffic reflector 605 to populate fields in the padding related to the current radio subscriber conditions when the test packet is received. Bootstrapping such behavior at the test traffic reflector 605 can also be done using signaling messages between the test endpoints or via other means.

Each flag bit indicates if a specific field has been populated by the test traffic reflector 605. The flags for padding version 2 are all populated by the mobile device 602. The flags are first set to zero in the downlink test packets 603 originating from the test equipment 600. The flag bits 812 provide a method for extracting information when a test packet reply is returned to the test equipment 600.

With reference to FIGS. 6, 8 and 15*a*, 15*c* and 15*d*, in operation, once a test packet is received at the mobile device 602, the test traffic reflector 605 requests information from the radio resource control block 609 based on the test packet version field 811 and flags 812 included in the test packet request 603 and determines what radio cell data is populated in the test packet reply 606. If the mobile device 602 knows the cell global identity of the radio access node 610 from which it has received the downlink test packet, the mobile device 602 sets the G bit of the flag bits 812 to 1 and populates the Cell Global Identity field 804 before transmitting the test packet reply uplink.

If the mobile device 602 knows its coordinates when it has received the downlink test packet, the mobile device sets the X and Y bits of the flag bits 812 to 1 and populates the UE Latitude and UE Longitude fields 805 and 806, respectively before transmitting the test packet reply uplink.

If the mobile device 602 knows the QoS class identifier (QCI) associated with the radio subscriber bearer from which it has received the downlink test packet, the mobile device sets the Q bit of the flag bits 812 to 1 and populates the QCI field 807 before transmitting the test packet reply uplink.

If the mobile device 602 knows the last Channel Quality Indicator (CQI) reported to the radio access node 610 when it has received the downlink test packet, the mobile device 602 sets the C bit of the flag bits 812 to 1 and populates the CQI field 808 before transmitting the test packet reply uplink.

If the mobile device 602 knows the downlink modulation and coding scheme (DL MCS) applicable for the radio subframe(s) for the downlink test packet, the mobile device 602 sets the M bit of the flag bits 812 to 1 and populates the DL MCS field 809 before transmitting the test packet reply uplink.

If the mobile device 602 knows the uplink modulation and coding scheme (UL MCS) applicable for the radio subframe(s) for the uplink test packet, the mobile device 602 sets the N bit of the flag bits 812 to 1 and populates the UL MCS field 810 before transmitting the test packet reply uplink.

The mobile device 602 may re-use the rest of the padding octets 813 in the test packet reply uplink. The mobile device 602 may also truncate/discard some of the highest-number of padding octets in order to obtain an equal IP packet size in each direction of transmission, when sufficient padding is present.

During normal operation, the test equipment 600 initiates one or more test streams towards a specific mobile device 602. The test packet requests originate from the test equipment 600 and each test stream is configured with the destination IP address assigned to the subscriber connection of the mobile device 602. The test traffic is easily identifiable by the radio access node 610 using multi-field classifiers (filters) capable of inspecting address, ports numbers, protocols or any other packet fields. The test traffic is intercepted by the radio access node 610 and the radio access node performs a lookup on its local tunnel mapping table (not shown) to determine the uplink bearer/tunnel information corresponding to the forward bearer/tunnel. An example of a radio access node performing lookup of local tunnel mapping data is disclosed in applicant's co-pending U.S. patent application Ser. No. 13/442,196 filed Apr. 9, 2012.

Figure 9:
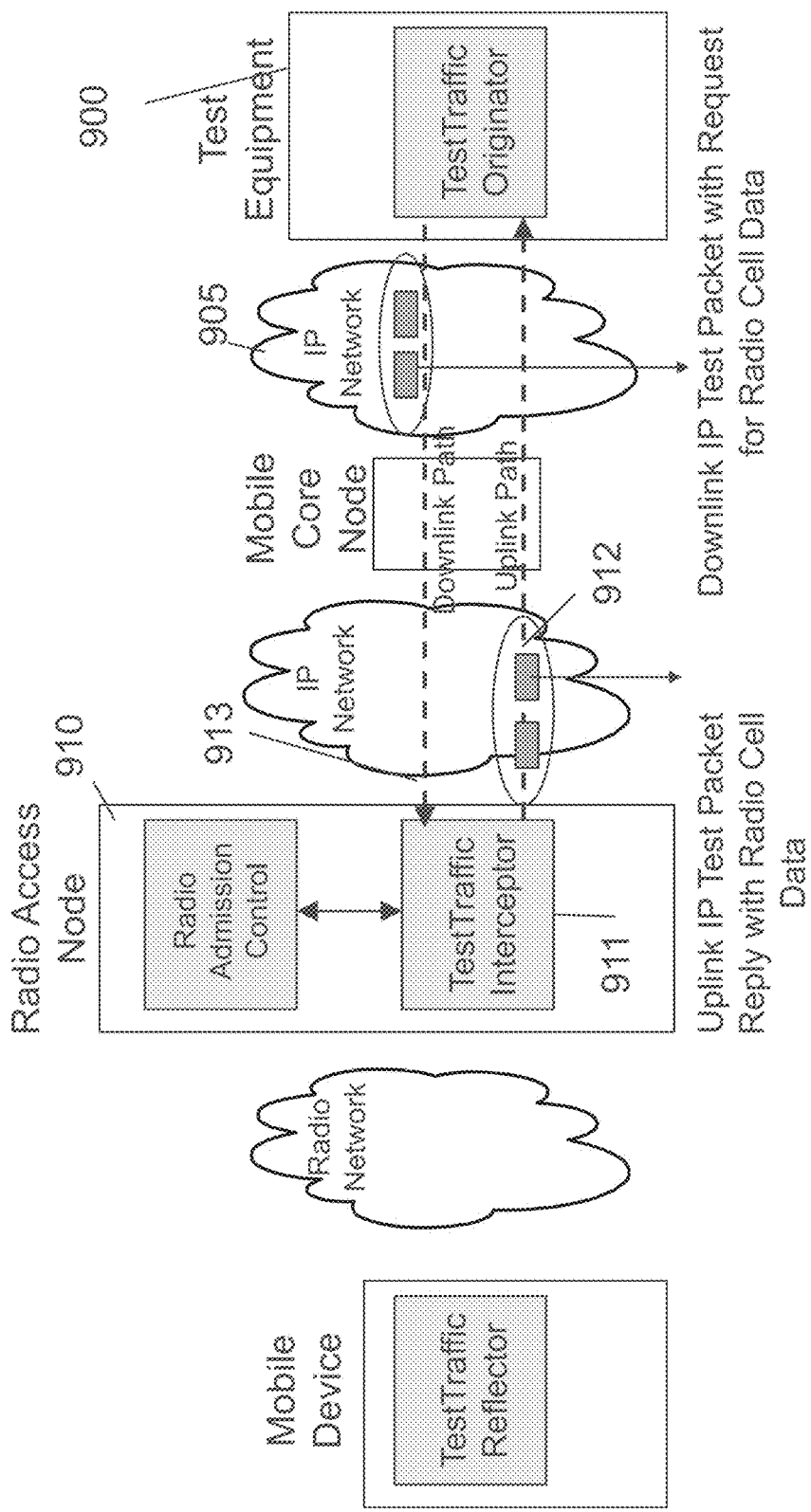
FIG. 9 depicts a block diagram of a communication system according to another exemplary embodiment of the present invention.

In the exemplary embodiment of FIG. 9, the test equipment 900 includes an indication in each downlink test packet request 905 informing the radio access node 910 to attempt piggybacking or including the radio cell conditions within the test stream. When the test packets are carried over UDP, the test traffic interceptor function 911 on the radio access node 910 transmits a test packet reply 912 uplink to the test equipment 900 in response to every received test packet. Each test packet reply 912 may contain radio cell data provided by the radio access node 910.

Some examples of radio cell data include cell global identity that the mobile device is connected to, total mobile device scheduling activity or relative load in the cell for the downlink direction, total mobile device scheduling activity or relative load in the cell for the uplink direction, physical Downlink Control Channel (PDCCH) utilization of the cell, number of active mobile devices in the cell for the downlink, number of active mobile devices in the cell for the uplink, number of RRC connected mobile devices in the cell and radio access node processor utilization.

Figure 10:
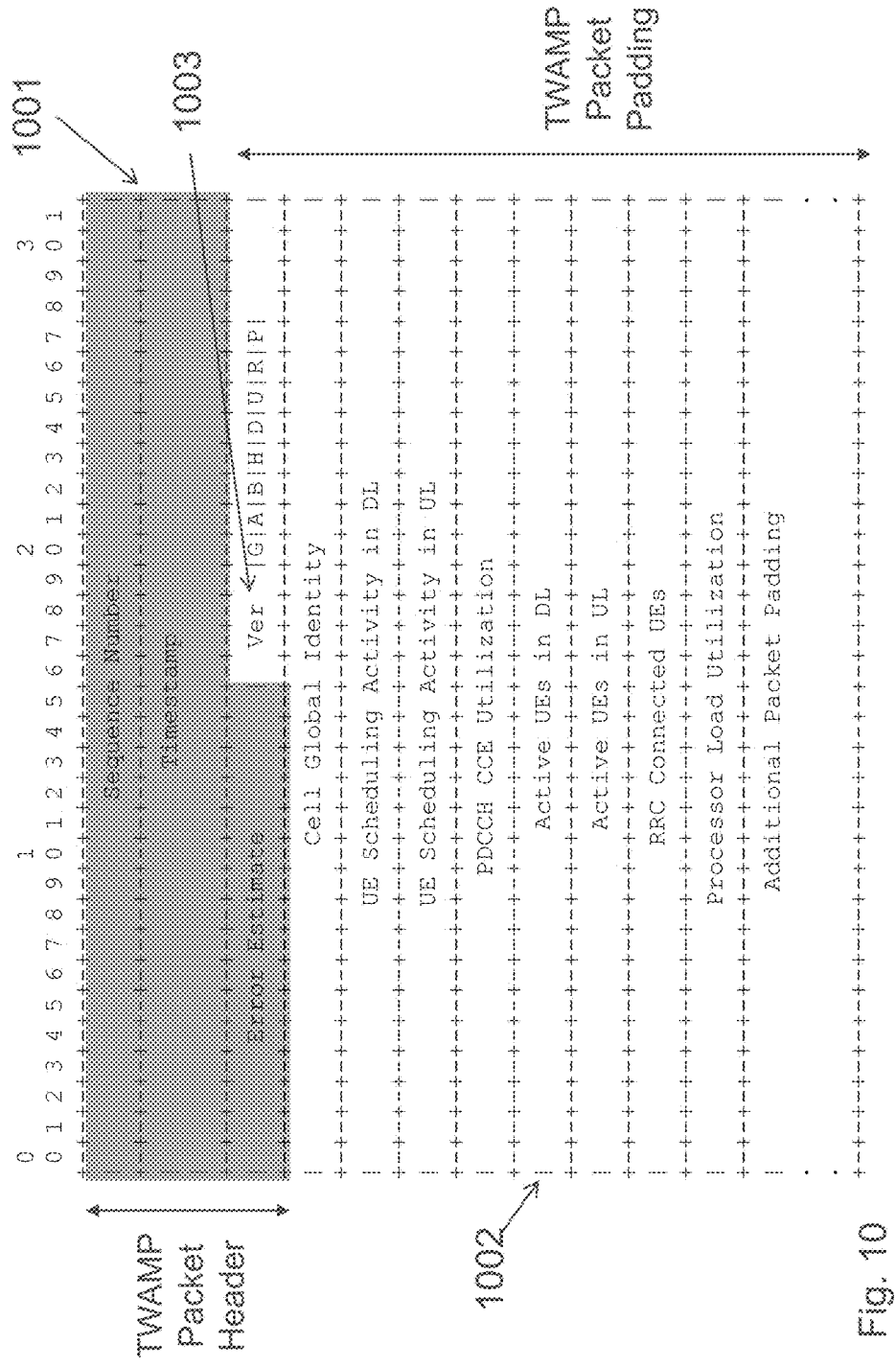
FIG. 10 depicts a (downlink) TWAMP test packet request according to another exemplary embodiment of the present invention.

An exemplary embodiment of further proposed downlink TWAMP test packet format is shown in FIG. 10. Reference to FIG. 9 will also be made to facilitate the description. The test packet header 1001 from each downlink test packet request includes the fields for measuring the path performance in the downlink direction 913 up to the radio access node. The test packet padding 1002 includes the packet fields describing the radio cell conditions. In the downlink direction, the packet fields of the test packet 905 describing the radio cell conditions is set to 0 by the test equipment except for the Ver (Version) field 1003.

Figure 11:
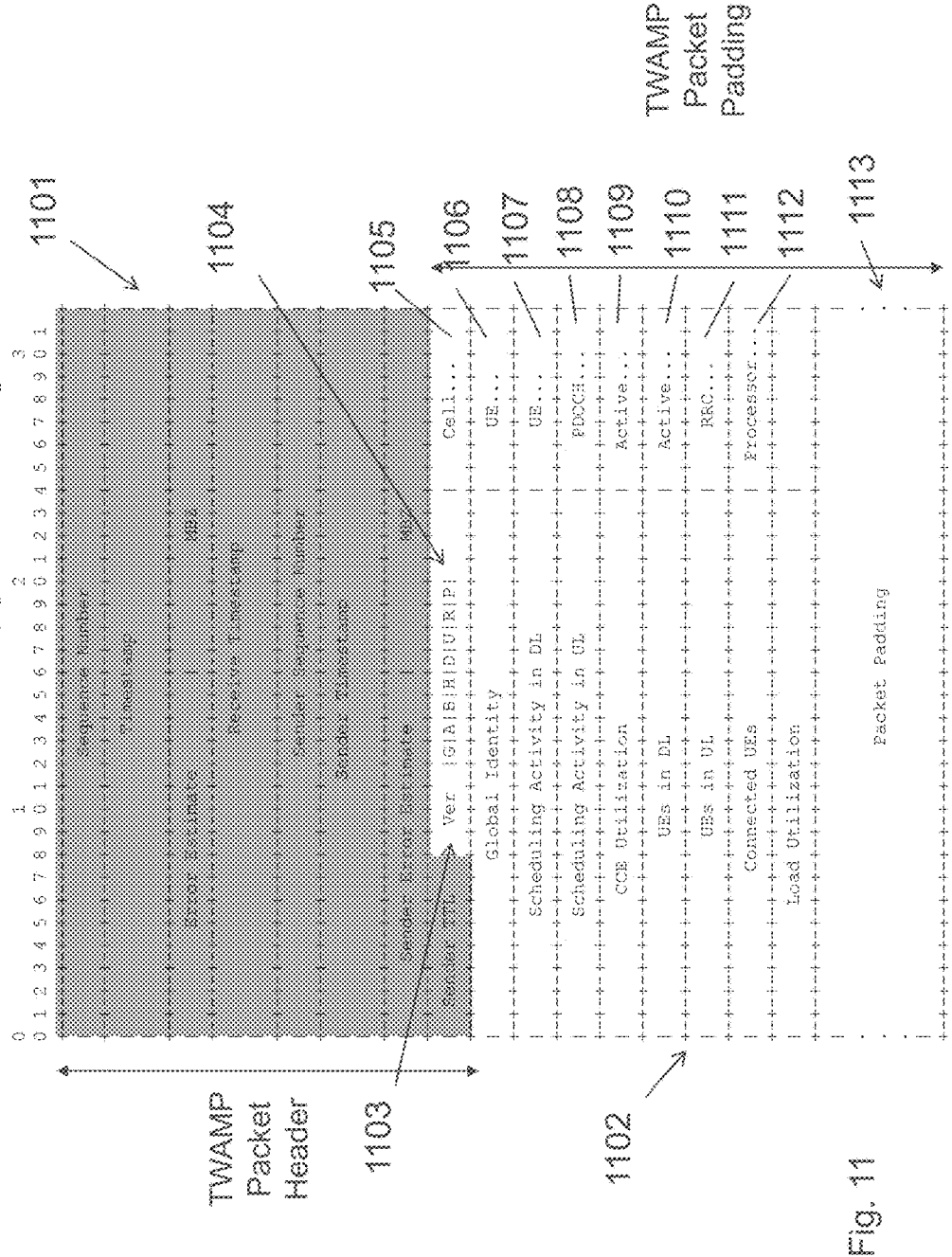
FIG. 11 depicts a (uplink) TWAMP test packet reply according to another exemplary embodiment of the present invention.

An exemplary embodiment of a further proposed TWAMP test packet reply format is shown in FIG. 11. The test packet header 1101 from each test packet reply 912 includes the fields for measuring the path performance in the uplink direction. It also includes the path performance information collected from the corresponding downlink test packet 905. The test packet padding 1102 includes the packet fields describing the radio cell conditions. In the uplink direction, the packet fields describing the radio cell condition is to be populated by the radio access node 910.

The first 34 bytes of the padding carry the version number 1103, flags 1104, cell global identify (CGI) 1105, mobile device scheduling activity or relative load in the cell for the downlink and uplink directions 1106 and 1107, respectively, percentage of Control Channel Element (CCEs) allocated to the Physical Downlink Control Channel (PDCCH) 1108, number of active mobile devices in the cell for the downlink and uplink directions 1109 and 1110, respectively and number of RRC connected mobile devices in the cell 1111. A version number 1103 and the sequence of flag bits 1104 are defined at the very beginning of the padding octets.

The Version (Ver) field 1103 is encoded in the first 4 bits. The padding version number identifies the structure of the padding octets, meaning of the flag bits and the behavior of test traffic originator 901 and interceptor 911. In this embodiment, version 3 is used for the purpose of piggybacking/adding radio cell conditions at the radio access node 910 with seven flag bits 1104: G, A, B, H, D, U, R and P. The version field 1103 is populated by the test equipment 900.

The version number 1103 provides one method of informing the test traffic interceptor 911 to populate fields in the padding 1102 related to the current radio cell conditions when the test packet 905 is received. Bootstrapping such behavior at the test traffic interceptor 911 can also be done using signaling messages between the test endpoints or via configuration done through the management interface.

Each flag bit indicates if a specific field has been populated by the test traffic interceptor 911. The flags for padding version 3 are all populated by the radio access node 910. The flags are set to zero in the downlink test packets 905 originating from the test equipment 900. The flag bits 1104 provide a method for extracting information when the test packet reply 912 is returned to the test equipment 900.

With reference to FIGS. 11 and 15a, 15b and 15d, in operation, if the radio access node 910 knows its cell global identity for which the downlink test packet is intended for, the radio access node sets the G bit to 1 and populates the Cell Global Identity field 1105 before transmitting the test packet reply.

If the radio access node 910 knows the total mobile device downlink scheduling activity, relative load or distribution for the cell the downlink test packet is intended for, the mobile device sets the A bit to 1 and populates the UE Scheduling Activity in DL field 1106 before transmitting the test packet reply.

If the radio access node 910 knows the total mobile device uplink scheduling activity, relative load or distribution for the cell the downlink test packet is intended for, the mobile device sets the B bit to 1 and populates the UE Scheduling Activity in UL field 1107 before transmitting the test packet reply.

If the radio access node 910 knows the percentage of Control Channel Element (CCEs), relative load or distribution allocated to the Physical Downlink Control Channel (PDCCH) for the cell the downlink test packet is intended for, the mobile device sets the H bit to 1 and populates the PDCCH CCE Utilization field 1108 before transmitting the test packet reply.

If the radio access node 910 knows the number of mobile devices that are considered active in the downlink direction in the cell the downlink test packet is intended for, the mobile device sets the D bit to 1 and populates the Total UEs in DL field 1109 before transmitting the test packet reply If the radio access node 910 knows the number of mobile devices that are considered active in the uplink direction in the cell the downlink test packet is intended for, the mobile device sets the U bit to 1 and populates the Total UEs in UL field 1110 before transmitting the test packet reply.

If the radio access node 910 knows the number of RRC connected mobile devices in the cell the downlink test packet is intended for, the mobile device sets the R bit to 1 and populates the RRC Connected UEs field 1111 before transmitting the test packet reply.

If the radio access node 910 knows its processor load utilization, relative load or distribution, when it has received the downlink test packet, the mobile device sets the P bit to 1 and populates the Processor Load Utilization field 1112 before transmitting the test packet reply.

The radio access node 910 may re-use the rest of the padding octets 1113 in the test packet reply 912. The radio access node 910 may also truncate/discard some of the highest-number of padding octets in order to obtain to equal IP packet size in each direction of transmission, when sufficient padding is present.

Figure 12:
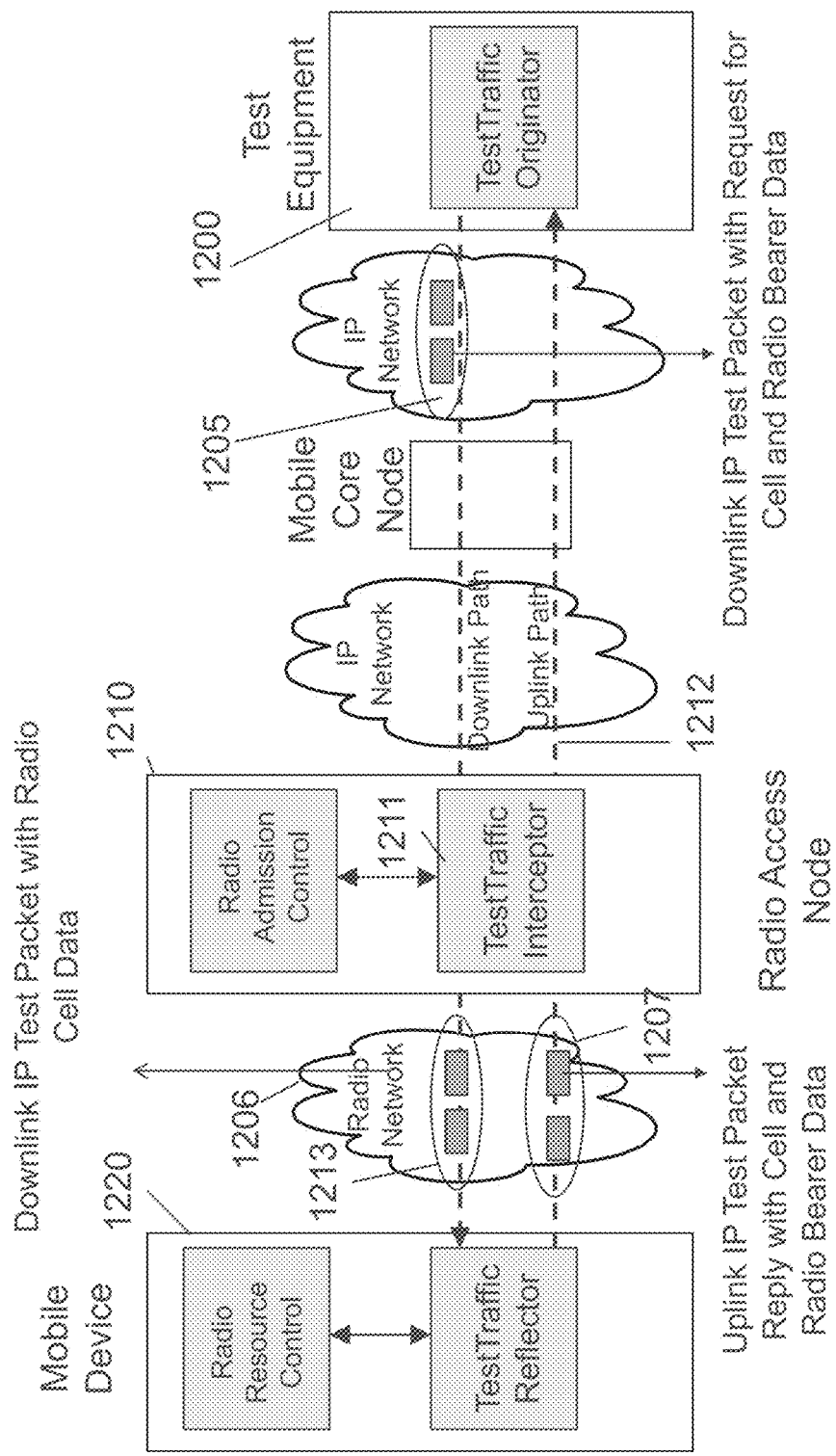
FIG. 12 depicts a block diagram of a communication system according to another exemplary embodiment of the present invention.

In the exemplary embodiment of FIG. 12, the test equipment 1200 includes an indication in each downlink test packet request 1205 informing the radio access node 1210 and mobile device 1220 to attempt piggybacking or including the radio cell conditions and radio bearer conditions, respectively, within the test stream. In the embodiment illustrated in FIG. 12, the test traffic interceptor 1211 can be configured to piggyback or include the radio cell conditions of the radio network 1206 on the downlink path towards the mobile device 1220 such that the uplink IP test packet reply 1207 includes both the cell and radio bearer data.

Although the test traffic interceptor 1211 of FIG. 12 can populate the radio cell data downlink in the test packet request 1213 to the mobile device 1220 or uplink in the test packet reply 1207 back to the test equipment 1200, in the preferred embodiment, when the test packets are carried over UDP, the test traffic interceptor block 1211 on the radio access node 1210 transmits a test packet in response to every received test packet.

Figure 13:
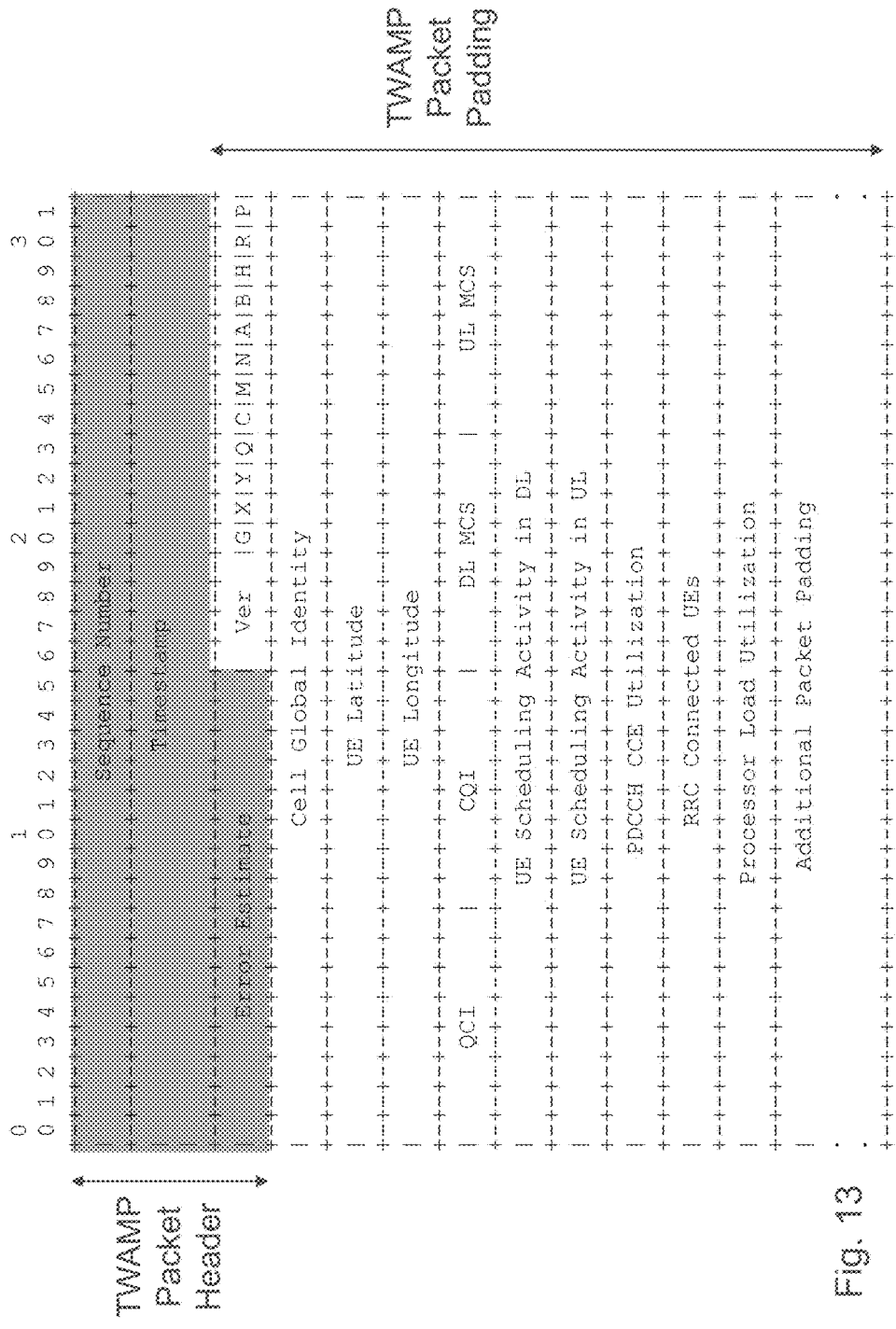
FIG. 13 depicts a (downlink) TWAMP test packet request according to yet another exemplary embodiment of the present invention.
Figure 14:
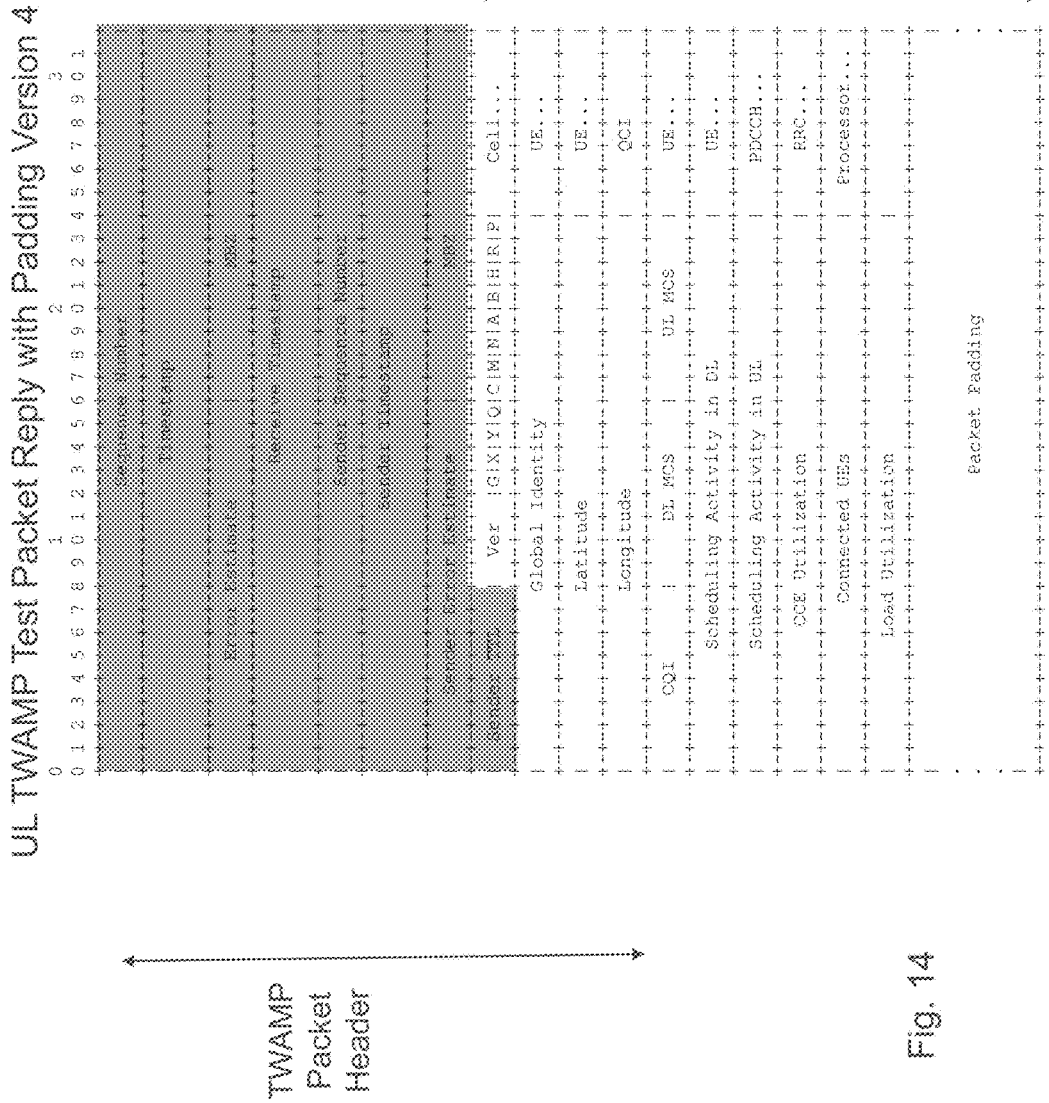
FIG. 14 depicts a (uplink) TWAMP test packet reply according to yet another exemplary embodiment of the present invention.

An exemplary embodiment of a downlink TWAMP test packet request and an uplink TWAMP test packet reply for use with the architecture of FIG. 12 is shown in FIGS. 13 and 14, respectively.

Figure 15A:
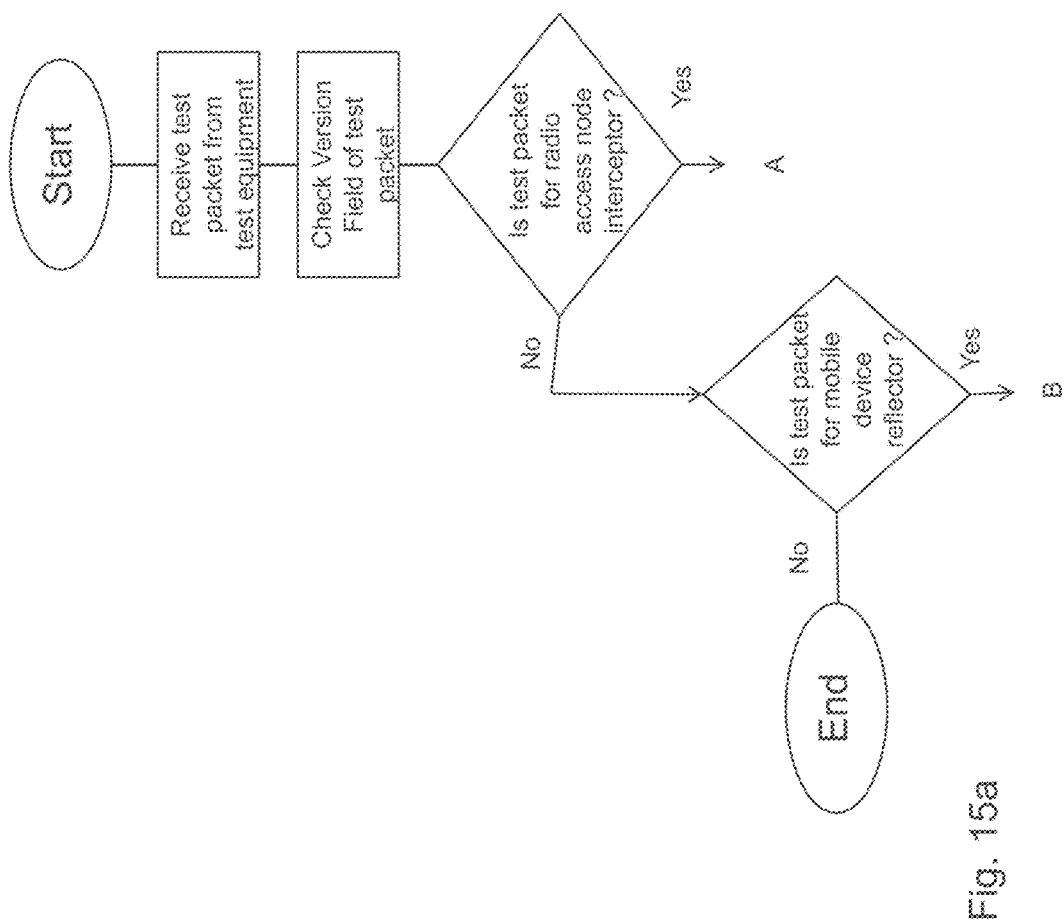
FIGS. 15a-15d are flowcharts depicting a method for a node to provide end-to-end path condition indicators of a mobile subscriber connection.
Figure 15B:
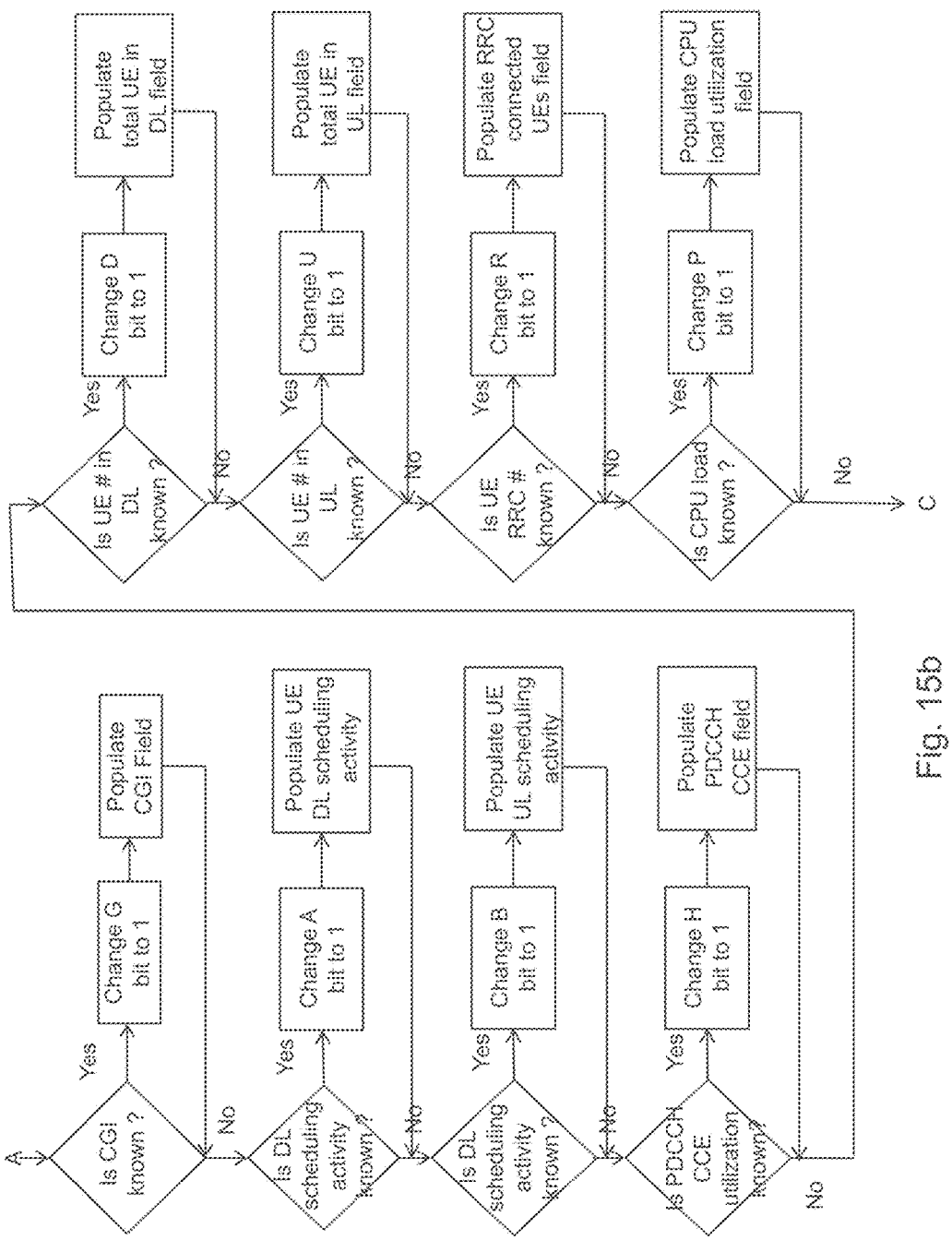
Figure 15C:
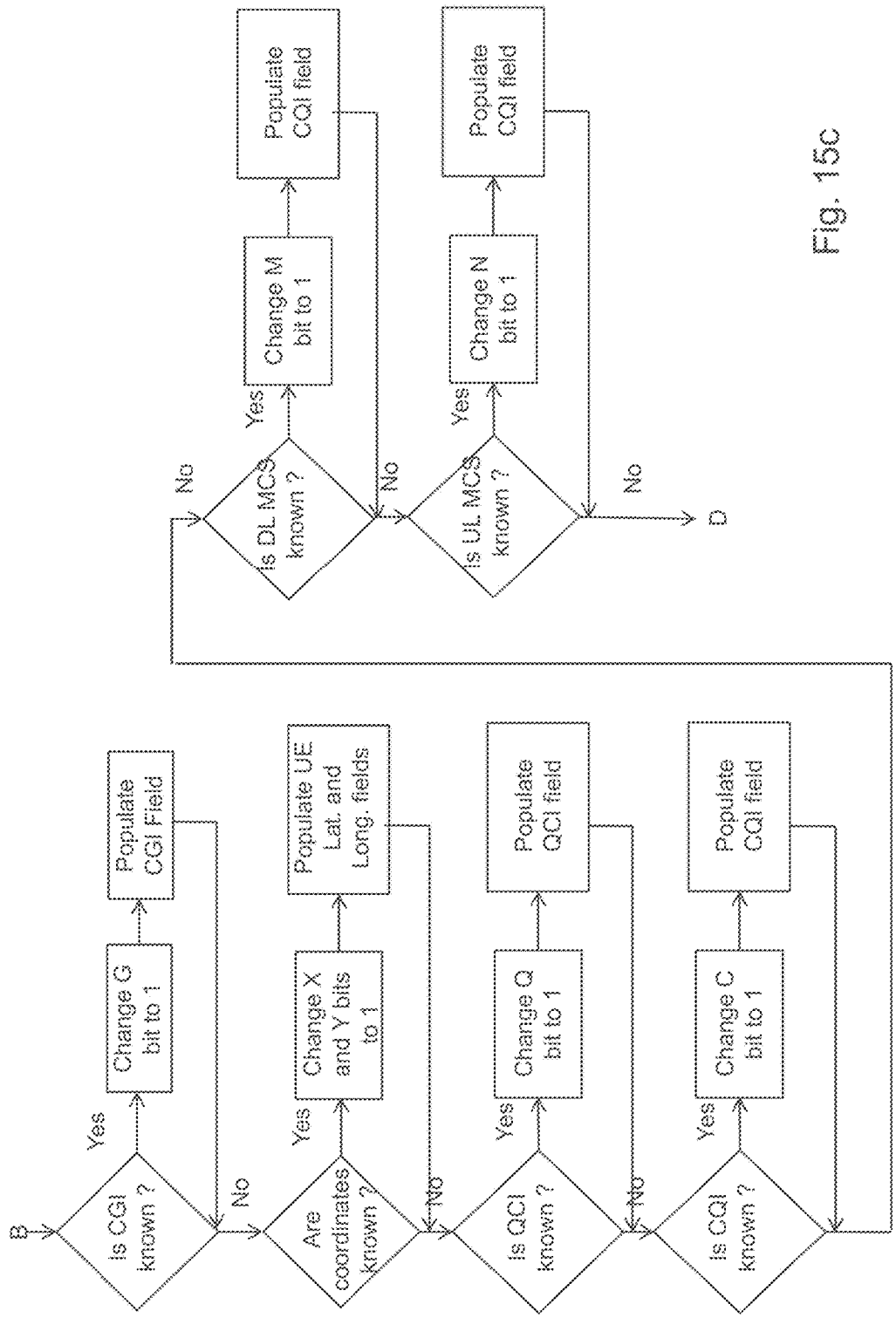
Figure 15D:
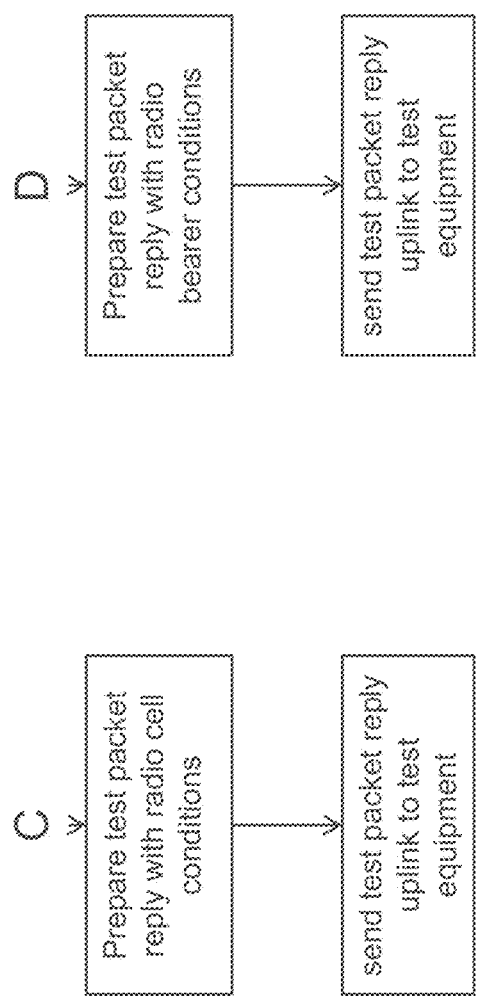

The flowcharts of FIGS. 15*a*, 15*b* and 15*d* illustrate the steps completed to provide the radio cell conditions on a test packet sent from the test equipment to a radio access node. The newly populated flag bits and fields are then sent back to the test equipment as part of a test packet reply.

The flowcharts of FIGS. 15*a*, 15*c* and 15*d* illustrate the steps completed to provide the radio bearer conditions on a test packet sent from the test equipment to a mobile device. The newly populated flag bits and fields are then sent back to the test equipment as part of the test packet replay.

As described for the above embodiments, each flag bit indicates if a specific field has been populated by the test traffic interceptor and reflector. The flags will be populated by the radio access node and the mobile device.

For each of the above described embodiments, the test equipment is responsible to process and collect the test packet replies. It creates a performance report for each test stream that has been configured to reach a mobile device. The mobile device report describes the characteristics of the end-to-end test stream including time when the end-to-end test stream started and ended, source and destination IP addresses and port numbers selected, the International Mobile Subscriber Identity (or something equivalent) of the mobile device if available, and cell global identity (or identities) and QoS class identifier detected.

The mobile device report includes end-to-end IP path performance results like the packet loss, packet delay, availability and available capacity graphs per transmission direction up to the mobile device. The IP path performance results up to the radio access node can also be depicted in separate graphs to show the impacts of the transport network on the end-to-end IP path performance. The IP performance data characterizing the transport network is obtained from a separate test stream that shares similar characteristics but is intercepted by the radio access node.

The test equipment also includes the radio bearer performance in the mobile device report including a graph of the distance between the mobile device and the center of the cell tower, a graph of the Channel Quality Indicator (CQI), a graph of the downlink modulation and coding scheme (DL MCS) and a graph of the uplink modulation and coding scheme (DL MCS).

The mobile device report may also include the radio cell performance during the same time period. The radio cell performance data is obtained from a separate test stream that shares similar characteristics but is intercepted by the radio access node. The report includes a graph of the radio cell scheduling activity per transmission direction, a graph of the relative load or utilization of the Physical Downlink Control Channel (PDCCH), a graph of the number of mobile devices that are considered active in the downlink and uplink direction in the cell, a graph of the number of RRC connected mobile devices in the cell and a graph of the radio access node processor utilization.

The radio bearer and radio cell performance graphs (or a subset of them) can be superimposed over the IP path performance graphs (or a subset of them) to better visualize the impacts of the radio bearer and radio cell conditions on the end-to-end IP performance.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a node, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

I claim:

1. A method, stored in a memory and executed on a processor, for measuring end-to-end path condition indicators of a mobile subscriber device connection, said method comprising:
sending a test packet from a network node to a mobile subscriber device connected to a radio access node, said test packet configured with a destination address assigned to the mobile subscriber device connection and having a packet version indicator requesting at least one of said mobile subscriber device to include radio bearer conditions and said radio access node to include radio cell conditions in a test packet reply, said mobile subscriber device acting as a test traffic reflector; and
receiving at said network node, a test packet reply said test packet reply including at least one of current radio bearer conditions from said mobile subscriber device and current radio cell conditions from said radio access node impacting the performance of the mobile subscriber device connection.

2. The method of claim 1, wherein said radio bearer conditions are described using one or more condition indicators, said indicators being one of a cell global identity for said mobile subscriber device, a geographical location of said mobile subscriber device, a quality of service call identifier, a channel quality indicator or downlink/uplink modulation scheme associated with said mobile subscriber device connection.

3. The method of claim 2, further comprising collecting said test packet reply, at a test controller for calculating and reporting test packet performance associated with said radio bearer conditions.

4. The method of claim 1, wherein said test packet reply includes said current radio cell conditions if said test packet has a radio access node packet version indicator requesting said radio access node to include radio cell conditions within said test packet reply.

5. The method of claim 4, wherein said radio cell conditions are described using one or more condition indicators, said indicators being one of a cell global identity for said mobile subscriber device, total downlink and uplink mobile device scheduling activities in a cell serving said mobile subscriber device, physical downlink control channel utilization, number of active mobile devices in said radio cell for downlink and uplink directions, number of connected mobile devices in said radio cell or radio access node processor utilization.

6. The method of claim 5, further comprising collecting said test packet reply, for calculating and reporting test packet performance associated with radio cell condition.

7. The method of claim 1, wherein said test packet reply further comprises an acknowledgement of the reception of said test packet.

8. The method of claim 1 wherein the packet version indication is to request both said mobile subscriber device to include radio bearer conditions and said radio access node to include radio cell conditions in a test packet reply.

9. A method, stored in a memory and executed on a processor, for measuring end-to-end path condition indicators of a mobile subscriber device connection, said method comprising:
receiving, at a mobile subscriber device connected to a radio access node, a test packet sent from a network node, said test packet configured with a destination address assigned to the mobile subscriber device connection and having a packet version indicator requesting at least one of said mobile subscriber device to include radio bearer conditions and said radio access node to include radio cell conditions in a test packet reply, said mobile subscriber device acting as a test traffic reflector; and
sending, by said mobile subscriber device, a test packet reply, to said network node, said test packet reply including current radio bearer conditions impacting the performance of the mobile subscriber device connection.

10. The method of claim 9, wherein said radio bearer conditions are described using one or more condition indicators, said indicators being one of a cell global identity for said mobile subscriber device, a geographical location of said mobile subscriber device, a quality of service call identifier, a channel quality indicator or downlink/uplink modulation scheme associated with said mobile subscriber device connection.

11. The method of claim 9, further comprising collecting said test packet reply, at a test controller for calculating and reporting test packet performance associated with said radio bearer performance.

12. The method of claim 9, wherein said test packet reply includes current radio cell conditions if said test packet has a radio access node packet version indicator requesting said radio access node to include radio cell conditions within said test packet reply.

13. The method of claim 12, wherein said radio cell conditions are described using one or more condition indicators, said indicators being one of a cell global identity for said mobile subscriber device, total downlink and uplink mobile device scheduling activities in a cell serving said mobile subscriber device, physical downlink control channel utilization, number of active mobile devices in said radio cell for downlink and uplink directions, number of connected mobile devices in said radio cell or radio access node processor utilization.

14. The method of claim 13, further comprising collecting said test packet reply for calculating and reporting test packet performance associated with radio cell performance.

15. The method of claim 9, wherein said test packet reply further comprises an acknowledgement of the reception of said test packet.

16. The method of claim 9 wherein the packet version indication is to request both said mobile subscriber device to include radio bearer conditions and said radio access node to include radio cell conditions in a test packet reply.

17. A mobile subscriber device for providing radio bearer connection indicators to a node, said mobile subscriber device comprising:
a radio bearer controller for monitoring, collecting and reporting radio bearer conditions;
a test traffic reflector for receiving a test packet from said node, said test packet configured with a destination address assigned to a connection of the mobile subscriber device and having a packet version indicator requesting at least one of said mobile subscriber device to include radio bearer conditions and said radio access node to include radio cell conditions in a test packet reply, for communicating with said radio bearer controller to retrieve current radio bearer conditions impacting the performance of the mobile subscriber device connection and sending a test packet reply, to said node, said test packet reply including current radio bearer conditions.

18. A mobile subscriber device as defined in claim 17, wherein said radio bearer conditions are described using one or more condition indicators, said indicators being one of a cell global identity for said mobile subscriber device, a geographical location of said mobile subscriber device, a quality of service call identifier, a channel quality indicator or downlink/uplink modulation scheme associated with said mobile subscriber device connection.

19. The mobile subscriber device of claim 17 wherein the packet version indication is to request both said mobile subscriber device to include radio bearer conditions and said radio access node to include radio cell conditions in a test packet reply.

20. A radio access node for providing radio cell condition indicators to a node, said radio access node comprising:
  a radio cell controller for monitoring, collecting and reporting radio cell conditions;
  a test packet interceptor, for intercepting a test packet from said node to a mobile subscriber device, said test packet configured with a destination address assigned to a connection of the mobile subscriber device and having a packet version indicator requesting at least one of said radio access node to include current radio cell conditions and said radio access node to include radio cell conditions, and for communicating with said radio cell controller to retrieve current radio cell conditions impacting the performance of the mobile subscriber device connection and sending a test packet reply, to said node, said test packet reply including current radio cell conditions.

21. The radio access node of claim 20, wherein said radio cell conditions are described using one or more condition indicators, said indicators being one of a cell global identity for said mobile subscriber device, total downlink and uplink mobile device scheduling activities in a cell serving said mobile subscriber device, physical downlink control channel utilization, number of active mobile devices in said radio cell for downlink and uplink directions, number of connected mobile devices in said radio cell or radio access node processor utilization.

22. The radio access node of claim 20 wherein the packet version indication is to request both said mobile subscriber device to include radio bearer conditions and said radio access node to include radio cell conditions in a test packet reply.

23. A method, stored in a memory and executed on a processor, for measuring end-to-end path condition indicators from a mobile subscriber device to a network node, said method comprising:
  sending a test packet from said network node towards said mobile subscriber device connected to radio access node, said test packet configured with a destination address assigned to a connection of the mobile subscriber device and having a first packet version indicator requesting said mobile subscriber device to provide radio bearer conditions to said test packet in a test packet reply, said mobile subscriber device acting as a test traffic reflector;
  intercepting said test packet reply generated by said mobile subscriber device at a radio access node serving said mobile subscriber device to include radio cell conditions if said test packet further includes a second packet version indicator;
  receiving, at said network node, said test packet reply including at least one of current radio bearer conditions and current radio cell conditions impacting the performance of the mobile subscriber device connection; and
  collecting, at said network node, one or more test packet replies to calculate end-to-end path condition performance between said network node and said mobile subscriber device.

24. The method of claim 23, further comprising collecting said test packet reply, at a test controller for calculating and reporting test packet performance associated with said radio bearer and radio cells conditions.

25. The method of claim 23 wherein the packet version indication is to request both said mobile subscriber device to include radio bearer conditions and said radio access node to include radio cell conditions in a test packet reply.

* * * * *